United States Patent [19]

Bucheli

[11] 4,270,434
[45] Jun. 2, 1981

[54] STRADDLING DOWEL

[75] Inventor: Josef Bucheli, Herrliberg, Switzerland

[73] Assignee: Tuflex AG, Switzerland

[21] Appl. No.: 961,649

[22] Filed: Nov. 17, 1978

[30] Foreign Application Priority Data

Dec. 20, 1977 [CH] Switzerland .................. 15713/77

[51] Int. Cl.$^3$ ............................................. F16B 13/10
[52] U.S. Cl. ...................................... 411/21; 411/49; 411/71
[58] Field of Search ................... 85/66, 79, 73–76, 85/86, 87; 405/259

[56] References Cited

U.S. PATENT DOCUMENTS

| 679,363 | 7/1901 | Church | 85/75 |
| 798,440 | 8/1905 | McNulty | 85/79 |
| 1,021,794 | 4/1912 | Pleister | 85/66 |
| 1,459,542 | 6/1923 | McCathron | 85/66 X |
| 2,658,550 | 11/1953 | Emshwiller | 85/66 X |
| 2,832,253 | 4/1958 | Allimann | 85/79 |
| 2,859,056 | 11/1958 | Marks | 85/79 UX |
| 3,552,258 | 1/1971 | Warner | 85/66 |

FOREIGN PATENT DOCUMENTS 1033614 7/1958 Fed. Rep. of Germany ............. 85/79
1270522 4/1972 United Kingdom ........................ 85/66

Primary Examiner—Ramon S. Britts
Attorney, Agent, or Firm—McGlew and Tuttle

[57] ABSTRACT

A dowel construction for anchoring an element in a borehole, comprises, a tubular dowel of a plastic material which is insertable into the borehole and advantageously has means thereon for preventing turning movement thereof relative to the borehole. The tubular dowel has a window opening for accommodating a straddling member which is disposed in the opening between a securing bolt insertable in the dowel and the borehole. The straddling member and the bolt are constructed so that there is a wedge-engagement surface between them which causes radial outward movement of the straddling member into engagement with the borehole when the bolt is moved in a withdrawal direction. Preferably, at least two metal straddle bodies are uniformly arranged over the circumference of the bolt and they preferably have cylindrical outer surfaces which are disposed in the window cutouts of the tubular plastic cage forming the tubular dowel. The straddle bodies are arranged diametrically opposite and they are positioned in the window cutouts which are disposed diametrically opposite to overlie the straddling elements.

5 Claims, 8 Drawing Figures

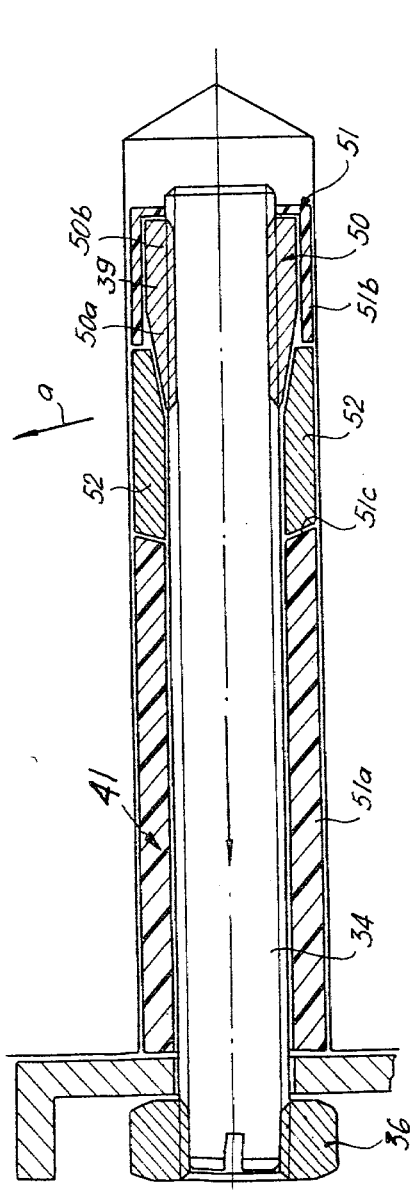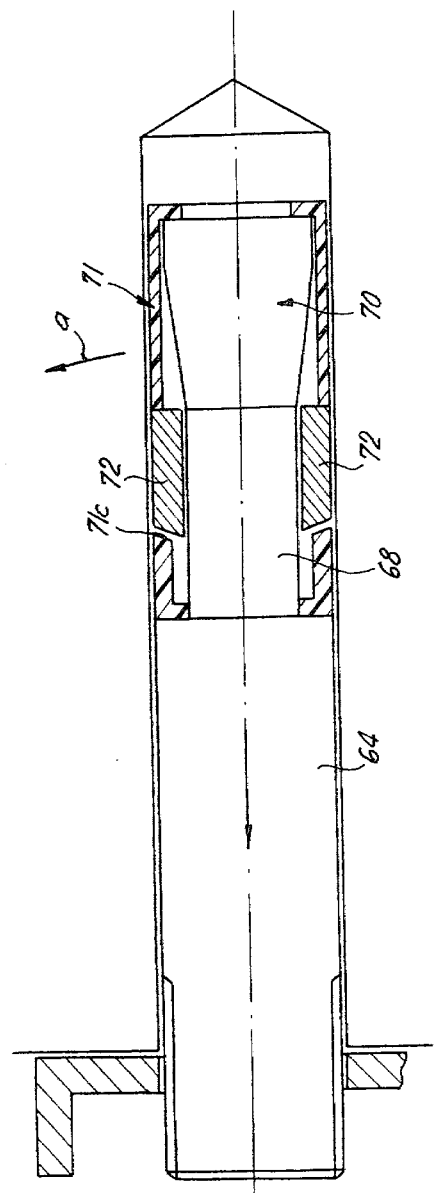

STRADDLING DOWEL

FIELD AND BACKGROUND OF THE INVENTION

This invention relates to the construction of dowels in general and, in particular, to a new and useful straddling dowel for anchoring an element in a borehole, which comprises a fastening bolt and a straddle part which widens in the forward direction, toward the introduced end, and can be brought into wedging engagement with a straddle element.

DESCRIPTION OF THE PRIOR ART

In a known metal dowel of this kind, the fastening bolt comprises a cylindrical shank provided with a thread and a thrust nut on its rear end and changes into a straddle part in the directin of its forward end, which, starting from a reduced diameter portion, comprises a straddle cone. The tapered portion of the straddle part supports a metal sleeve having an outside diameter corresponding approximately to the diameter of the bolt shank and is provided with straddle tongues in the shape of shell portions formed by oblong slots.

Upon introducing the dowel into the borehole, the fastening bolt is pulled to a certain extent in the outward direction by turning the thrust nut. Since the metal sleeve is held fast in the borehole by friction, the straddle cone of the bolt is pulled into the straddle portion of the sleeve and spreads the same apart due to its conical shape. This straddle sleeve is made of a hard steel and this makes it relatively expensive. Because of its brittleness, the shell-shaped tongues frequently break off the relatively narrow sleeve webs which hold the tongues together through an annular piece. In addition, during the spreading apart, the tongues are conically deformed to such an extent that, for example, they can no longer return into their initial positions if the bolt is screwed in again. Further, a smooth steel sleeve does not become instantly fixed in its axial position in the borehole and, also, the spreading apart force of the tongues must overcome the resistance to buckling at the sleeve web connections and, thus, the appliation of a relatively strong force is required.

SUMMARY OF THE INVENTION

The present invention eliminates the drawbacks of the prior art and is directed to a straddling dowel which ensures not only satisfactory pulling parameters, but also a "soft", immediate pulling of the bolt, requiring little force, even upon the slightest turning of the nut and, at the same time, results in a secure and immediate fixing of the straddle element to the wall of the borehole.

To this end, and in accordance with the invention, it is provided that the straddle element intended to cooperate with the straddle part widening in the direction of the forward end of the bolt comprises at least two metal straddle bodies which are uniformly distributed over the circumference of the bolt and have cylindrical outer surfaces and are disposed in window cutouts of a sleeve-shaped plastic cage which is firmly supported, by means of annular portions provided on both sides of the window cutouts, on the bolt or the straddle part.

A substantial advantage of the inventive construction is the complete separation of the straddle bodies from the supporting member securing their correct position, so that they form individual elements, namely, a cage for performing a holding function and straddle bodies separated therefrom and performing a straddling and clamping function. Since the provided straddle bodies which are designed as individual parts and are advantageously made of steel, are not firmly connected to the supporting plastic cage, the straddling, i.e., the radial spreading apart of these bodies by wedging engagement with the straddle part of the bolt, does not require any buckling in connection areas and thus no application of stronger forces for the deformation of metal parts.

On the other hand, the plastic cage serving as a support for the straddle bodies can be engaged over the metal both with considerably better adhesion than with a steel sleeve. The same applies analogously to its immediate adhesion to the wall of the borehole. Aside from these basic advantages relative to the single piece design of the prior art straddle bodies with their metallic supporting part, the invention makes it possible to adapt the dowel to most various cases of application.

A particular substantial advantage is that the inside surface of the straddle bodies may be conformed to a corresponding, for example, conical or wedge-shaped straddle surface of the straddle part of the bolt, permitting a straight radial spreading apart of the straddle bodies, so that the outside surfaces of the bodies remain in a coaxial position relative to the wall of the borehole. Thereby, the entire outer surface of the straddle body is pressed against the borehole wall under a uniform contact pressure and indentations, such as produced by a pure edge pressure of straddle bodies occupying an oblique position relative to the bolt axis due to the conicity of the straddle part, are avodied.

Accordingly, it is an object of the invention to provide a dowel construction for anchoring an element in a borehole which comprises a tubular dowel of plastic material which is insertable into the borehole and has at least one straddling member opening in the periphery thereof, and which includes a securing bolt which is engageable into the tubular dowel and at least one straddling member disposed in the opening and overlying a portion of the circumference of the securing bolt, the securing bolt and the straddling member defining a wedge-engagement surface therebetween causing radial outward movement of said straddling member into wedging engagement with the material surrounding the borehole, wherein, the bolt is moved in a withdrawal direction.

A further object of the invention is to provide a straddling dowel which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIGS. 5 and 6 are views similar to FIG. 4 of other embodiments of the invention.

DESCRIPTION OF THE PREFERRED EMBODIMENTS

Figure 1:
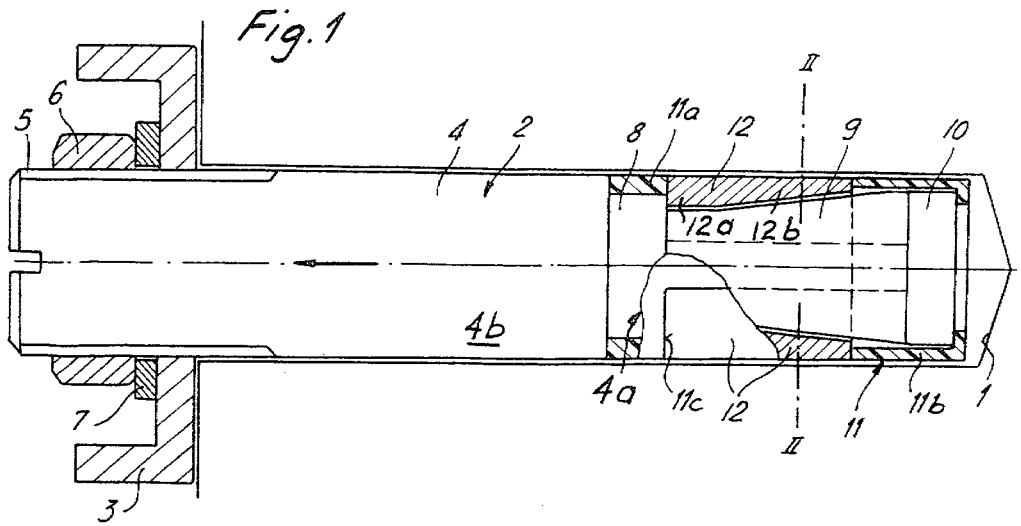
FIG. 1 is an axial sectional view of a dowel constructed in accordance with the invention.
Figure 2:
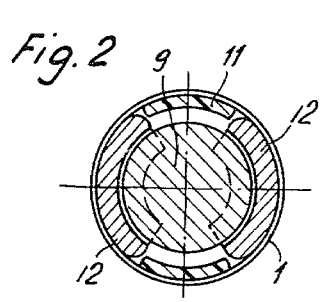
FIG. 2 is a section taken along the line II-II of FIG. 1.

Referring to the drawings in particular, the invention embodied therein, comprises, a dowel construction for anchoring an element, such as an object 3, in a borehole 1, which comprises, a tubular dowel or cage 11 into which a securing bolt 4 is insertable. FIG. 1 shows a borehole 1 provided in a wall, in which a straddling dowel 2 is inserted for fixing an object 3 to the wall. Straddling dowel 2 comprises a metal fastening bolt 4 having a cylindrical shank which is dimensioned to the borehole diameter and is provided, on its rear end portion, with a thread 5 carrying a thrust nut 6 applying against the object 3 to be fixed through a shim or washer 7.

An inside end portion 4a of bolt 4 is designed as a straddle portion. The inside end portion comprises a cylindrical shoulder 8 with a reduced diameter relative to the shank at the end of a shank portion 4b, followed in the direction of the forward end of the bolt by a cone 9 widening up to approximately the shoulder diameter and terminating in a cylindrical shoulder 10. The angle of cone α is advantageously 3° to 10°.

The two shoulders 8 and 10 at both ends of cone 9 each support annular portion 11a, 11b, respectively, of a plastic cage 11. Cage 11 includes two window cutouts 11c between the annular end portions 11a and 11b, which are diametrally opposite to each other and are of a rectangular shape. Depending on the size of the dowel, three or more such cutouts 11c, uniformly distributed over the circumference of the cage around the cone 9, may also be provided. While the axial length of annular portion 11a corresponds to the length of shoulder 8, the cutouts are shorter than cone 9 and their length is advantageously equal to one-half to two-thirds of the length of the cone.

The outside diameter of the cylindrical plastic cage 11 is substantially equal to the diameter of bolt 4 and thus to the borehole diameter. In each of window cutouts 11c of cage 11, a shell-shaped straddle body 12 of steel is accommodated, having dimensions which correspond approximately to that of cutouts 11 c. In order to prevent the straddle bodies 12 from falling out of the cage cutouts by chance, the straddle bodies may be slightly clamped in the cutouts, or small projections may be formed on the cutout edges of the cage 11 on the outside thereof, which engage over the straddle bodies inserted in the cutouts. Each straddle body 12 comprises a cylindrical outside surface having a radius corresponding to that of the bolt shank, and an inner surface conformable to and applying against the cone 9.

It will be understood that the necked-down portion of the bolt adjacent shoulder 8 may be formed by a short cylindrical portion which is then followed by a forward conical portion. In such a case, the inner surface of straddle bodies 12 which abuts shoulder 8 by its rearward front face, will have a conformably cylindrical portion 12a over a short distance and only then conical portion 12b. For a perfect operation, however, it is of importance that at least in its forward conical portion 12b, the inside surface of the straddle bodies 12 be conformable to cone 9 of the bolt, i.e. conical.

After the described straddling dowel as shown in FIG. 1 has been inserted into the borehole to fix the object 3 to the wall, bolt 4 is pulled in the outward direction by a distance corresponding approximately to the difference in length between cone 9 and straddle body 12, which, in the present example, is done by a corresponding rotation of thrust nut 6. During this motion, bolt 4 is held fast against rotation, which is supported by the friction of the plastic cage 11 on the borehole wall. This non-rotating position of cage 11 and, thereby, of bolt 4 may be ensured from the start of turning nut 6, by small cams, tongues or ribs 20 (see FIG. 3) provided on the outside surface of plastic cage 11, by which the cage and the straddle bodies 12 accommmodated therein are, at the same time, fixed in the axial direction. The pulling of the bolt 4 brings cone 9 into wedge-like engagement with the axially fixed straddle bodies 12 which are thereby pushed radially outwardly to be pressed by their entire surface into the wall of the borehole. The straddling dowel is thereby perfectly anchored in the borehole.

Figure 3:
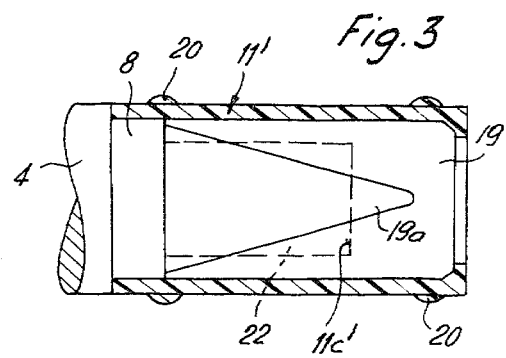
FIG. 3 is a partial view similar to FIG. 1 showing another embodiment of the invention.

In the variation of FIG. 3, the straddle portion of bolt 4 does not comprise a cone, but has the shape of a cylinder 19 in continuation of shoulder 8, which is provided with diametrally opposite flats 19a forming the wedging surfaces and narrowing out in the forward direction. Depending on the desired number of straddle bodies, more than two such wedge surfaces 19a may, of course, be provided. Here again, a plastic cage 11' with window cutouts 11c is provided, in accordance with FIG. 3, and beads 20 are formed on the outside of the cage to fix the dowel in the borehole. Again, the straddle bodies 22 of steel are inserted in window cutouts 11c' of the plastic cage, having a cylindrical outer surface which is flush with the cage, with the radius of this cylindrical surface corresponding to that of the bolt shank.

The inner surface of the straddle bodies 22 applying against wedge surface 19a is conformably flat and slopes toward the bolt axis. While pulling bolt 4 out by means of thrust nut 6, the engagement between the wedge surfaces or flats 19a and the straddle bodies 22 moves the bodies radially outwardly, so that they are pressed by their outer surfaces radially into the wall of the borehole, whereby, the dowel is perfectly anchored in the borehole.

In the foregoing example, straddling dowels 12 are shown in which the straddle portion comprises a single cone or set of wedge surfaces. It is easily possible, however, to design the bolt with two cones or two sets of wedge surfaces which are separated from each other by a cylindrical shoulder or collar, and with the plastic cage having corresponding circles of window cutouts arranged one after the other and receiving the straddle bodies.

Figure 4:
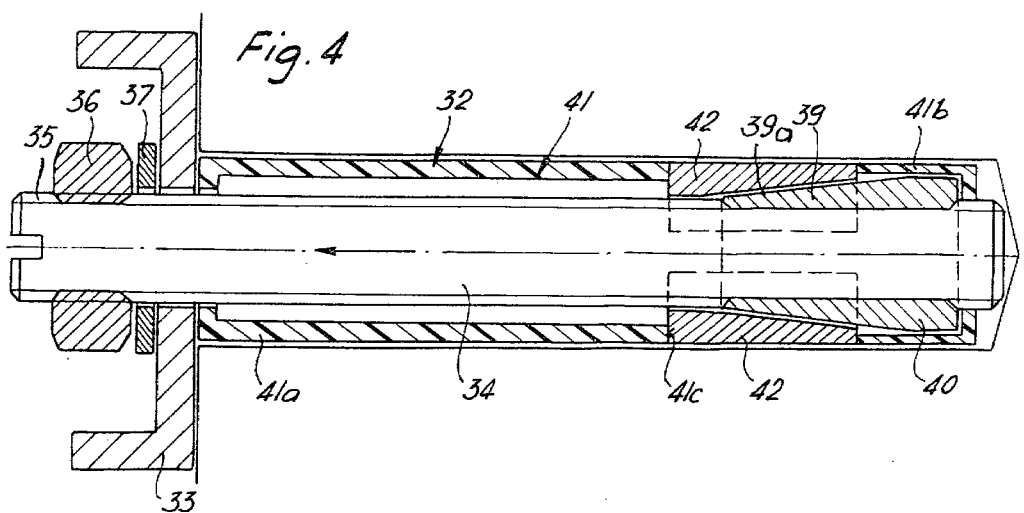
FIG. 4 is a view similar to FIG. 1 of still another embodiment of the invention.

In contradistinction to the foregoing described embodiments, the straddling dowel 32, shown in FIG. 4, comprises a bolt 34 which is provided wih a thread 35 over its entire length. This dowel 32 is again inserted in a borehole 1 to fix an object 33 to the wall. On its rear portion, bolt 34 carries a thrust nut 36 and a washer 37. The metallic fastening bolt 34 has a smaller diameter than borehole 1 and carries, in the zone of its forward end portion, a straddle part 39 which is provided with an inside thread and whose outer surface 39a, starting from the diameter of the bolt, widens conically toward the forward end where it terminates in a cylindrical shoulder 40.

A plastic cage 41 conformable to the diameter of the borehole surrounds the bolt 34 substantially along the entire length thereof and is received in the borehole and engages on the borehole by means of radial end flanges. Plastic cage 41 is provided with two diametrally opposite, rectangular window cutouts 41c which extend approximtely from a location slightly before straddle part 39 and partly cover the same. It will be understood that three or more window cutouts 41c uniformly distributed over the circumference of the cage might also be provided.

In order to ensure the rigidity of the sleeve portion 41a of cage 41 extending from near the bolt end up to the window cutouts 41c, as far as possible, the wall of this portion is slightly thicker than that of the forward annular portion 41b which engages the cylindrical end shoulder 40 of straddle portion 39. It is also possible to make the rearward annular portion 41a of the cage shorter and to bridge its distance from the borehole mouth by a corresponding metal sleeve.

Each window cutout 41c of cage 41 accommodates a shell-shaped straddle body 42 made of steel. The outer surface of each straddle body 42 is cylindrical, with its radius corresponding to the outer radius of the cage 42 and thus to that of borehole 1. The inside surface of each straddle body applies, along a smaller portion, against bolt 34 and, a larger portion, against straddle part 39 and is correspondingly cylindrically or conically formed.

In order to anchor dowel 32 in borehole 1, the non-rotatably retained bolt 34 is pulled outwardly, by turning thrust nut 36, through a distance approximately corresponding to the axial length of the portions of the conical surface of straddle part 39 which are not covered by straddle bodies 42. Since plastic cage 41, due to the friction in the borehole, holds the straddle bodies 42 against axial displacement, which may still be assisted by projections of tongues provided on the outside of the cage, the wedging engagement of the straddle part 39 axially moved along with bolt 34 causes straddle bodies 42 to move radially outwardly and to apply under pressure and with their entire outside surface against the wall of the borehole. A perfect anchoring of the dowel in the borehol is thereby obtained.

It will be understood that, in this case again, analogously to the variation of FIG. 3, the outer surface of the straddle part 39 might be made cylindrical and be provided with corresponding wedge surfaces which would be conformable to the inside surfaces of the straddle bodies.

Experience has shown that, due to the wedging engagement of the cone or wedge surfaces conformed to each outer of the straddle portion and the straddle bodies, particularly satisfactory pulling parameters are obtained since, in this case, the straddle bodies are pressed into contact with the wall of the bore truly radially, thus, uniformly, and with their entire outer surface.

FIG. 5 shows a variation of FIG. 4. In this case again threaded bolt 34 carries a straddle part 50 on its forward end. This part comprises a rear portion 50a, which, starting from the bolt diameter, widens conically approximately up to the middle of the length, but not quite to the diameter of the borehole, which is followed by a cylindrical forward portion 50b. Cylindrical straddle bodies 52 made of steel are received in the window cutouts 51c of plastic cage 51 which extends over the major part of the length of the bolt, although it may also be shorter at the rear and lengthened by a metal sleeve extending up to the bore mouth, as mentioned in connection with FIG. 4. On their outside, the cylindrical straddle bodies 52 are flush with cage 51.

In the same manner as described in the above examples, two or more straddle bodies 52 may be provided which are distributed uniformly over the circumference of the bolt and each are accommodated in a window cutout of the cage. The inner surface of straddle bodies 52 is cylindrical in its rear portion, which is relatively large, and applies directly against the corresponding bolt portion behind straddle portion 50, while the forward portion of the inner surface of the straddle bodies partly engages over conical portion 50c of straddle part 50 and is conformable to the conicity of this portion of the straddle part. As soon as the bolt 34 of this dowel introduced into the borehole is pulled axially outwardly by, for example, turning thrust nut 36, the cone portion 50a of straddle part 50 engages below straddle bodies 52. During this engagement, the straddle bodies are spread apart in the direction of arrow a and are pressed against the wall of the borehole in a corresponding oblique position. With a hard wall material, a relatively short retraction of bolt 34, causing this oblique spreading of straddle bodies 52, is necessary to obtain a satisfactory anchoring of the dowel, while with a softer wall material, the bolt must be retracted through a somewhat longer distance. As soon as the cylindrical portion 50b of straddle part 50 engages below the cylindrical inside surface of the straddle bodies, the rear portions of the straddle bodies are also moved radially outwardly, so that the contact surface of these bodies is correspondingly enlarged.

FIG. 6 shows a dowel which also exhibits the advantages of a separate straddle body retained in a plastic cage. This embodiment provides a bolt 64 approximately corresponding to bolt 4 of the first embodiment, whose shank comprises a cylindrical portion 68 of a smaller diameter followed in the forward direction by a straddle cone 70. Shank portion 68 and cone 70 are surrounded by a cylindrical plastic cage 71 which, on its outside, is flush with the rear portion of bolt 64 which is conformed to the diameter of the borehole.

In the zone adjacent cone 70 of cylindrical portion 68, cage 71 is provided with window cutouts 71c, each accommodating a shell-shaped straddle body 72 made of steel. Straddle bodies 72 which are cylindrical on their outside and flush with cage 71, apply with corresponding cylindrical inner surfaces against cylindrical portion 68 of the bolt. As the bolt 64 is pulled axially outwardly by, for example, means of a thrust nut (not shown), cone 70 engages below straddle bodies 72, so that these bodies are spread apart in the direction of arrow a, and pressed into the wall of the borehole in a corresponding oblique position.

Figure 7:
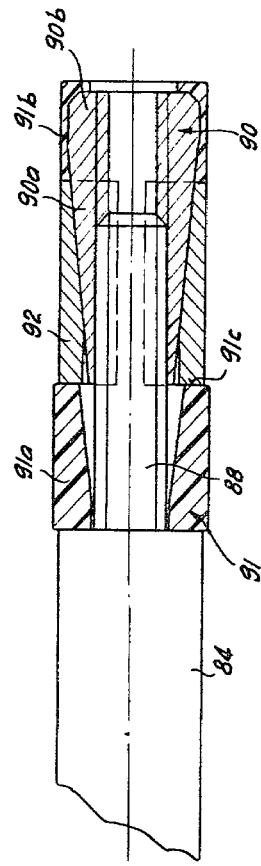
FIGS. 7 and 8 are views similar to FIG. 3 of yet other embodiments of the invention.

In the embodiment shown in FIG. 7, bolt 84 is provided with a threaded portion 88 of a smaller diameter, carrying a straddle part 90, with an inside thread on its free end. Analogously to the embodiment described above, straddle part 90 comprises a conical rear portion 90a and a cylindrical forward portion 90b. Cylindrical straddle bodies 92 made of steel are received in window cutouts 91c of a plastic cage 91, and have an inside surface which conforms to the supporting cone portion 90a of straddle part 90. The forward annular portion 91b of the cage is flush with the outside of straddle bodies 92 and surrounds the cylindrical portion 90b of straddle part 90.

The rear annular portion 91a of cage 91 is cylindrical on its outside and its outer diameter is at least equal to, but preferably somewhat larger than, the diameter of the borehole, i.e., it is also larger than the diameter of the bolt which corresponds to the outer diameter of straddle bodies 92 and of the forward annular portion 91b of cage 91. The rear annular portion 91a comprises a conical bore whose conicity corresponds to that of straddle part 90 and blends at its narrowest point into a relatively short cylindrical surface forming the seat of this annular portion 91a on the threaded, reduced diameter portion 88 of bolt 84. The rear front face of this annular portion 91a applies against the step shoulder of bolt 84.

Upon introducing the straddling dowel into the prepared borehole, straddle part 90 can be pulled outwardly by correspondingly turning bolt 84, whereby, part 90 is pulled into the conical bore of annular portion 91a of cage 91. Cage 91 and, thereby, straddle bodies 92, is secured against turning in the borehole by the slight clamping of its rear annular portion 91a in the hole. The retraction of the straddle part 90, which is secured against rotation by the cage, causes straddle bodies 92 to be engaged by straddle part 92 from below, whereby, they are pressed radially outwardly against the wall of the borehole. Here also, the straddle bodies 92 do not come into an oblique position so that they apply against the borehole by their entire outer surface.

Figure 8:
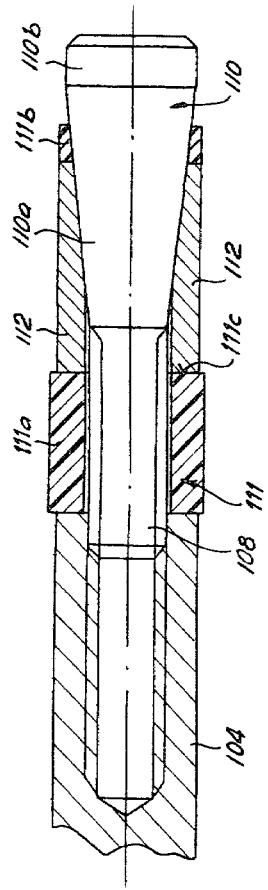

While in the preceding embodiment, the straddle part is received on the outside thread of an extended thread of the bolt and is axially displaceable, in the embodiment of FIG. 8, the bolt 104 is provided with a tapped hole in which a corresponding bolt 110 having an outer thread is received. This threaded bolt 108 is surrounded by the rear cylindrical portion 111a, threaded on the outside and inside, of plastic cage 111, having window cutouts 111c, in which the metallic straddle bodies 112 are received.

The outwardly cylindrical straddle bodies 112 apply, by their inner conical surface, against the corresponding conical surface of straddle part 110 adjacent bolt 108. In this embodiment, the forward annular portion 111b, of cage 111 is also supported on conical portion 110a of straddle part 110 which terminates in a cylindrical portion 110b projecting at the forward end from cage 111.

Here again, cage 11, whose rear annular portion 111b has a slightly larger diameter than the borehole, is secured against rotation after the dowel has been introduced into the hole. By correspondingly turning the bolt 104, threaded bolt 108, along with straddle part 110, are pulled axially outwardly. During this motion, straddle part 110 engages below straddle bodies 112 which are thereby pressed radially outwardly and then come into pressure contact with the wall of the borehole along their entire outer surface.

The manufacture of the relatively simply designed straddle bodies as individual parts, separate from the cage, is inexpensive and a relatively small initial force is needed for spreading apart these loosely inserted individual bodies, since no deformation of the material (buckling) is to be overcome. On the other hand, the cage made of plastic is relatively inexpensive and easy to manufacture. It may be manufactured by, for example, injection molding as two identical half-shells connected along a single middle line, which are then united to a sleeve.

Due to the resilience of the material for the cage, the cage can be firmly engaged over the bolt, and the ribs, tongues, or similar projections which secure the cage in the borehole against rotation and axial motion can also be more easily formed thereon than in the metallic straddle sleeves of the prior art, which are made in a single piece and provided with straddle tongues.

While specific embodiments of the invention have been shown and described in detail to illustrate the application of the principles of the invention, it will be understood that the invention may be embodied otherwise without departing from such principles.

What is claimed is:

1. A dowel construction for anchoring an element in a borehole of a wall comprising a metallic bolt adapted to be received in the borehole, said bolt having a cylindrical shank portion of uniform diameter corresponding to the diameter of the borehole, a conical portion having an angle of conicity of from 3° to 10° and conically expanding toward an end of the bolt adapted to be received in the borehole, an inner cylindrical portion of a diamter smaller than the diameter of said shank portion and greater than the smallest diameter of the conical portion connecting said shank portion and said conical portion and a cylindrical end portion connected to said conical portion, a tubular cage element mounted on said bolt about said conical portion and having a rear annular portion arranged on said inner cylindrical portion and abutting said shank portion and a front annular portion overlapping and abutting the front face of cylindrical end portion of said bolt, said tubular cage element being plastic and having a plurality of circumferentially spaced apertures between said rear and front annular portions of rectangular shape, a metallic shell-shaped straddling member mounted and retained in each of said apertures for radial movement, said straddling member abutting said inner cylindrical bolt portion having an interior conical surface conforming to and engaged on said conical portion of said bolt and an outer cylindrical surface having a radius corresponding to the radius of the outer surface of said tubular cage member, and means for axially moving said bolt relative to said tubular cage element to cause radially outward movement of said straddling member to wedgingly engage said bolt to the surface defining the borehole.

2. The dowel construction according to claim 1, wherein each of said apertures has a length equal to one-half to two-thirds of the length of the conical portion.

3. The dowel construction according to claim 1, wherein said inner cylindrical portion includes a threaded portion, said conical portion includes a sleeve threadably engaged with said bolt, and said tubular cage member includes an annular member engaged around said sleeve.

4. The dowel construction according to claim 1, wherein said rear annular portion includes a conical bore having a conicity corresponding to the surface of said conical portion.

5. The dowel construction according to claim 1, wherein said rear annular portion has an outer diameter larger than the diameter of said shank portion.

* * * * *